(12) United States Patent
Kim et al.

(10) Patent No.: US 6,879,549 B2
(45) Date of Patent: Apr. 12, 2005

(54) BRAKE CIRCUIT FOR THREE-BEAM OPTICAL TRACKING SYSTEM

(75) Inventors: Je-kook Kim, Yongin (KR); Young-wook Jang, Yongin (KR)

(73) Assignee: Samsung Electronics Co., Ltd. (KR)

( * ) Notice: Subject to any disclaimer, the term of this patent is extended or adjusted under 35 U.S.C. 154(b) by 184 days.

(21) Appl. No.: 10/226,919

(22) Filed: Aug. 23, 2002

(65) Prior Publication Data

US 2003/0058092 A1 Mar. 27, 2003

(30) Foreign Application Priority Data

Sep. 27, 2001 (KR) .......................................... 2001-60022

(51) Int. Cl.[7] .............................................. G11B 21/08
(52) U.S. Cl. .............................. 369/30.17; 369/30.16; 360/78.06
(58) Field of Search ......................... 369/30.17, 30.16, 369/30.1, 30.11, 30.12, 30.13, 30.14, 44.21, 44.27, 44.37, 44.38; 380/78.04, 78.05, 78.06, 69, 75

(56) References Cited

U.S. PATENT DOCUMENTS

| | | | | |
|---|---|---|---|---|
| 4,677,602 A | * | 6/1987 | Okano et al. | 369/30.13 |
| 4,805,163 A | * | 2/1989 | Ohnuki | 369/44.32 |
| 4,866,687 A | * | 9/1989 | Kasai et al. | 369/30.15 |
| 5,572,504 A | * | 11/1996 | Min | 369/215 |
| 5,621,709 A | * | 4/1997 | Takahashi | 369/44.28 |
| 5,699,332 A | * | 12/1997 | Nakano | 369/30.16 |

* cited by examiner

Primary Examiner—Tan Dinh

(74) Attorney, Agent, or Firm—Mills & Onello LLP

(57) ABSTRACT

A brake signal generating circuit and method for improving the efficiency of a lens brake in an optical disc reproducing system are provided. The brake signal generating circuit includes: a brake signal generator which receives a mirror signal that detects the track movement of a main beam and generates a first brake signal or a second brake signal for selecting predetermined operation mode signals in response to a first brake selection signal; a first operation mode generator which generates a processing value of the gain and phase of a tracking error as a first operation mode signal in response to a predetermined first control signal; a second operation mode generator which generates a correction value of a tracking loop offset as a second operation mode signal in response to a second control signal; a third operation mode generator which generates a value obtained by multiplying a value of the first operation mode signal by a predetermined value K1, where K1 is a non-zero real number, as a third operation mode signal; a fourth operation mode generator which generates as a fourth operation mode signal a value obtained by subtracting the value of the first operation mode signal from a value of the second operation mode signal, multiplying the result of the subtraction by the predetermined value K1, and adding the value of the second operation mode signal to the product; a fifth operation mode generator which generates a predetermined reference voltage as a fifth operation mode signal; and a switch unit which outputs one of the first through fifth operation mode signals in response to the first or second brake signal and second through fourth brake selection signals. The amount of braking is inverted in accordance with the amount of error in a track deviation direction and multiplied by a gain factor to improve the brake efficiency. In addition, the settling time after a track jump is reduced, the data access can be faster, and the unstable state, for example, due to track skipping, can return to the original stable state quickly.

54 Claims, 6 Drawing Sheets

BRAKE CIRCUIT FOR THREE-BEAM OPTICAL TRACKING SYSTEM

BACKGROUND OF THE INVENTION

1. Field of the Invention

The present invention relates to an optical disc reproducing system such as a compact disc player (CDP), a digital versatile disc player (DVDP) or a digital versatile disc ROM (DVDROM), and more particularly, to a brake signal generating circuit for improving the efficiency of a lens brake in an optical disc reproducing system and a method thereof.

2. Description of the Related Art

Typically, an optical disc reproducing system includes a spindle motor for rotating an optical disc, a focus actuator for emitting a laser beam onto the optical disc, a tracking actuator for tracing a track of the optical disc, and a sled motor for operating a pickup.

To quickly find data recorded in the optical disc, the tracking actuator or the sled motor is used to jump tracks. Immediately after jumping the tracks, a tracking pull-in needs to be performed so that the found data can be reproduced normally. However, the inertia after the track jump may cause the tracking actuator to be pulled out which leads to the failure of the tracking pull-in. As a solution to this problem, a brake signal generating circuit is used.

A brake signal generating circuit used in existing optical disc reproducing systems will be described with reference to the attached drawings.

For example, in a compact disc using 3 beam signals, a main beam is located at the center of a track of the disc, an F beam (side beam) is located at the upper right side of the track of the disc and an E beam (side beam) is located at the lower left side of the track of the disc. When the main beam moves along a pit, a radio frequency output (RFO) signal is generated due to the current difference resulting from the reflection between the pit and a mirror. If the RFO signal moves the mirror between tracks for the track jump, the amount of the emitted beams increases and the lower part of the RFO signal looks like a sine wave. The RFO signal is shown in (b) of FIGS. 3A and 3B. A mirror signal MIRR detects the track movement of the main beam using the tilt of the RFO signal generated when the tracking actuator traces tracks. That is, if the MIRR signal is detected, it indicates that the main beam moves from one track to an adjacent track. The MIRR is shown in (c) of FIGS. 3A and 3B.

To jump tracks, the jump pulse forces the main beam to move between tracks, and after the track jump, the main beam may move between tracks due to the inertia of the tracking actuator even though the track movement should not occur. The tracking error signal TE, which is the differential signal between the MIRR and the side beam, is used to indicate whether the main beam moves from the inner track to the outer track or vice versa.

If the main beam moves from the inner track to the outer track, the F beam moves to the mirror and the amount of light increases. Since the E beam moves above the pit, the amount of light decreases and a positive error is generated in the TE indicated as an F-E signal. If the main beam moves from the outer track to the inner track, the E beam moves to the mirror and the amount of light increases. In addition, since the F beam moves above the pit, the amount of light decreases and a negative error is generated in the TE indicated as an F-E signal. The TE is shown in (e) of FIGS. 3A and 3B.

When the TE is sampled to make a digital signal, a track zero crossing (TZC) signal is generated. The TZC signal is shown in (f) and (g) of FIGS. 3A and 3B. As shown in FIGS. 3A and 3B, the TZC signal is sampled at rising and falling edges.

FIG. 1 is a block diagram showing an existing brake signal generating circuit that includes a latch 13, an inverter 15, a AND unit 17, first through third operation mode generators 21, 23 and 25, and switches SW1 and SW2.

In FIG. 1, the latch 13 receives the MIRR signal that detects the track movement of the main beam, latches the MIRR signal at the rising and falling edges of the TZC signal input to the clock terminal and outputs a latched mirror signal R_MIRR.

If the main beam moves from the inner track to the outer track, the R_MIRR signal is generated in inverse phase to the TZC signal due to the phase relation between the MIRR signal and the TZC signal. When the main beam moves from the outer track to the inner track, the signal R_MIRR is generated in the same phase as the TZC signal. The R_MIRR signal helps to identify whether the main beam moves from the inner track to the outer track or vice versa.

When the optical disc reproducing system normally reproduces data from a disc or jumps tracks, a low-level brake enable signal BRKENB is externally input. Then, when the track jump is complete, a low-level brake enable signal BRKENB is externally input so that the tracking pull-in can be performed using the brake signal TRBRK.

The AND unit 17 generates a brake signal TRBRK by performing an AND-operation on the R_MIRR signal and the BRKENB signal inverted by the inverter 15. That is, if the level of the BRKENB is low, the AND unit 17 generates a brake signal for controlling the switch SW2.

In response to the first control signal CTRL1, the first operation mode generator 21 generates a processing value of the gain and the phase of the TE, i.e., the first operation mode signal TRDREG, when the optical disc reproducing system is in a normal reproduction mode so that the tracking actuator traces the track normally. Here, CTRL1 is externally input and indicates an address and a command that control the operation of the first operation mode generator 21.

In response to the second control signal CTRL2, the second operation mode generator 23 generates a correction value of the tracking loop offset, i.e., the second operation mode signal TRDAVR. Here, the offset refers to approximately 200~400 mV DC offset of the RFO signal caused by the light reflection when the main beam moves over the edge of the pit. Since the offset correction method is obvious to those with ordinary skill in the art, the method will not be explained here. In addition, CTRL2 is externally input and indicates an address and a command that control the operation of the second operation mode generator 23.

The third operation mode generator 25 generates a predetermined reference voltage as a fifth operation mode signal VREFS. The reference voltage is half of the power voltage, that is, ½ VDD.

The operation of the existing brake signal generating circuit 10 shown in FIG. 1 will now be described in more detail.

If a brake enable signal BRKENB at a high level is generated when the optical disc reproducing system is in a normal reproduction mode or a track jump mode, the brake signal TRBRK is generated in a low level and enables the switch SW2 to be connected to the first operation mode signal TRDREG. Then, the first operation mode generator 21 generates and externally outputs the first operation mode signal TRDREG. Therefore, in the normal reproduction mode, the tracking actuator is controlled to normally trace the tracks.

When the track jump is complete, if a brake enable signal BRKENB at a low level is generated, the brake signal TRBRK is generated in a high level and enables the switch SW2 to be connected to the output signal of the switch SW1. Then, in response to the brake selection signal BRKSEL, the switch SW2 is connected to the second mode operation signal TRDAVR or third operation mode signal VREFS. Here, the brake selection signal BRKSEL is input to control the switch SW1 and the logic level of the brake selection signal BRKSEL is determined by a microprocessor (not shown). The logic levels of the brake enable signal BRKENB and the brake signal TRBRK may be opposite to the ones described above depending on the circuit configuration.

In case the switch SW2 is connected to the third operation mode signal VREFS, the error, during a brake operation, in a track deviation direction is mute not to be output. Instead, a predetermined reference voltage is applied for brake operation and to prevent track skipping. That is, as shown in (j) of FIGS. 3A and 3B, if the main beam moves from the inner track to the outer track, the reference voltage is applied by muting the error processing of a positive movement direction. If the main beam moves from the outer track to the inner track, the reference voltage is applied by muting the error processing of a negative movement direction.

In case the switch SW2 is connected to the second operation mode signal TRDAVR, the predetermined reference voltage is not fed for the brake operation. Instead, a correction value of a tracking loop offset is output to prevent track skipping.

However, in the above method, the number of skipped tracks, which would be one or two or up to a few tens, is not considered to control the brake operation, Therefore, the brake control cannot be performed accurately.

SUMMARY OF THE INVENTION

To solve the above-described problems, it is a first object of the present invention to provide a brake signal generating circuit for improving the efficiency of a lens brake by inverting the amount of braking in accordance with the value of error in a track deviation direction and multiplying it by a gain factor.

It is a second object of the present invention to provide a brake signal generation method in which the amount of braking is inverted in accordance with the value of the error in a track deviation direction and multiplied by a gain factor in order to improve the brake efficiency.

In accordance with the present invention, there is provided brake signal generating circuit comprising a brake signal generator, a first operation mode generator, a second operation mode generator, a third operation mode generator, a fourth operation mode generator, a fifth operation mode generator, and a switch unit.

The brake signal generator receives a mirror signal that detects the track movement of a main beam and generates a first brake signal or a second brake signal for selecting predetermined operation mode signals in response to a first brake selection signal. The first operation mode generator generates a processing value of the gain and phase of a tracking error as a first operation mode signal in response to a predetermined first control signal. The second operation mode generator generates a correction value of a tracking loop offset as a second operation mode signal in response to a predetermined second control signal. The third operation mode generator generates a value obtained by multiplying a value of the first operation mode signal by a predetermined value K1, where K1 is a non-zero real number, as a third operation mode signal. The fourth operation mode generator generates as a fourth operation mode signal a value obtained by subtracting the value of the first operation mode signal from a value of the second operation mode signal, multiplying the result of the subtraction by the predetermined value K1, and adding the value of the second operation mode signal to the product. The fifth operation mode generator generates a predetermined reference voltage as a fifth operation mode signal. The switch unit outputs one of the first through fifth operation mode signals in response to the first or second brake signal and second through fourth brake selection signals.

It is preferable that the brake signal generator comprise: a latch which responds to rising and falling edges of a track zero crossing signal generated from a signal difference between side beams and latches the mirror signal to output a latched mirror signal; a first AND unit which generates the first brake signal for selecting one of the first through fifth operation mode signals by performing an AND-operation on an inverted signal of a brake enable signal for generating the first or second brake signal and the latched mirror signal; a delay unit which receives the mirror signal and outputs a delayed mirror signal in response to a predetermined clock signal; a second AND unit which generates the second brake signal for selecting one of the first through fifth operation mode signals by performing an AND-operation on an inverted signal of the brake enable signal and the delayed mirror signal; and a first switch which selects and outputs the first or second brake signal in response to the first brake selection signal.

In accordance with another aspect of the present invention, the present invention also provides a brake signal generating circuit comprising: a brake signal generator which receives a mirror signal that detects the track movement of a main beam and generates a first brake signal that selects predetermined operation mode signals in response to a track zero crossing signal generated from a signal difference of side beams; a first operation mode generator which generates a processing value of the gain and phase of a tracking error as a first operation mode signal in response to a predetermined first control signal; a second operation mode generator which generates a correction value of a tracking loop offset as a second operation mode signal in response to a second control signal; a third operation mode generator which generates a value obtained by multiplying a value of the first operation mode signal by a predetermined value K1, where K1 is a non-zero real number, as a third operation mode signal; a fourth operation mode generator which generates a predetermined reference voltage as a fourth operation mode signal; and a switch unit which outputs one of the first through fourth operation mode signals in response to the first brake signal and first and second brake selection signals.

It is preferable that the brake signal generator comprise: a latch which responds to rising and falling edges of the track zero crossing signal generated from the signal difference between the side beams and latches the mirror signal to output a latched mirror signal; and a first AND unit which generates the first brake signal for selecting one of the first through fourth operation mode signals by performing an AND-operation on an inverted signal of a brake enable signal for generating the first brake signal and the latched mirror signal.

In accordance with another aspect of the present invention, there is also provided a brake signal generating circuit comprising: a brake signal generator which receives a mirror signal that detects the track movement of a main beam and generates a first brake signal that selects predetermined operation mode signals in response to a track zero crossing signal generated from the signal difference of side beams; a first operation mode generator which generates a processing value of the gain and phase of a tracking error as a first operation mode signal in response to a predetermined first control signal; a second operation mode generator which generates a correction value of a tracking loop offset as a second operation mode signal in response to a second control signal; a third operation mode generator which generates as a third operation mode signal a value obtained by subtracting a value of the first operation mode signal from a value of the second operation mode signal, multiplying the result of the subtraction by a predetermined value K1, where K1 is a non-zero real number, and adding the value of the second operation mode signal to the product; a fourth operation mode generator which generates a predetermined reference voltage as a fourth operation mode signal; and a switch unit which outputs one of the first through fourth operation mode signals in response to the first brake signal and first and second brake selection signals.

It is preferable that the brake signal generator comprise: a latch which responds to rising and falling edges of the track zero crossing signal generated from the signal difference between the side beams and latches the mirror signal to output a latched mirror signal; and a first AND unit which generates the first brake signal for selecting one of the first through fourth operation mode signals by performing an AND-operation on an inverted signal of a brake enable signal for generating the first brake signal and the latched mirror signal.

In accordance with another aspect of the present invention, there is provided a brake signal generation method that improves the efficiency of a lens brake of an optical disc reproducing system, the method comprising: (a) receiving a mirror signal that detects the track movement of a main beam and generating a first or second brake signal that selects a plurality of operation mode signals for controlling the brake amount in response to a first brake selection signal; and (b) outputting one of the plurality of operation mode signals in response to the first or second brake signal and a plurality of brake selection signals.

It is preferable that step (a) comprise: (a1) responding to rising and falling edges of a track zero crossing signal generated from a signal difference between side beams and latching the mirror signal to output a latched mirror signal; (a2) generating the first brake signal for selecting one of the plurality of operation mode signals by performing an AND-operation on an inverted signal of a brake enable signal for generating the first or second brake signal and the latched mirror signal; (a3) receiving the mirror signal and generating a delayed mirror signal in response to a predetermined clock signal; (a4) generating the second brake signal for selecting one of the plurality of operation mode signals by performing an AND-operation on an inverted signal of the brake enable signal and the delayed mirror signal; and (a5) selecting and outputting the first or second brake signal in response to the first brake selection signal.

In accordance with another aspect of the present invention, there is provided a brake signal generation method that improves the efficiency of a lens brake of an optical disc reproducing system, the method comprising: (a) receiving a mirror signal that detects the track movement of a main beam and generating a first brake signal that selects a plurality of operation mode signals for controlling the brake amount in response to a track zero crossing signal generated from a signal difference of side beams; (b) outputting one of the plurality of operation mode signals in response to the first brake signal and a plurality of brake selection signals.

It is preferable that step (a) comprise: (a1) responding to rising and falling edges of the track zero crossing signal generated from the signal difference between the side beams and latching the mirror signal to output a latched mirror signal; and (a2) generating the first brake signal for selecting one of the plurality of operation mode signals by performing an AND-operation on an inverted signal of a brake enable signal for generating the first brake signal and the latched mirror signal.

In another embodiment, the brake signal generation method according to the present invention is identical to the embodiment described above except for the third operation mode signal generation method.

As described above, according to the brake signal generating circuit and the method thereof of the present invention, the amount of braking is inverted in accordance with the value of error in the track deviation direction and multiplied by a gain factor to improve the braking efficiency. In addition, the settling time after jumping tracks is reduced, data can be accessed faster, and an unstable state, such as track skipping, can be quickly returned to the initial stable state.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
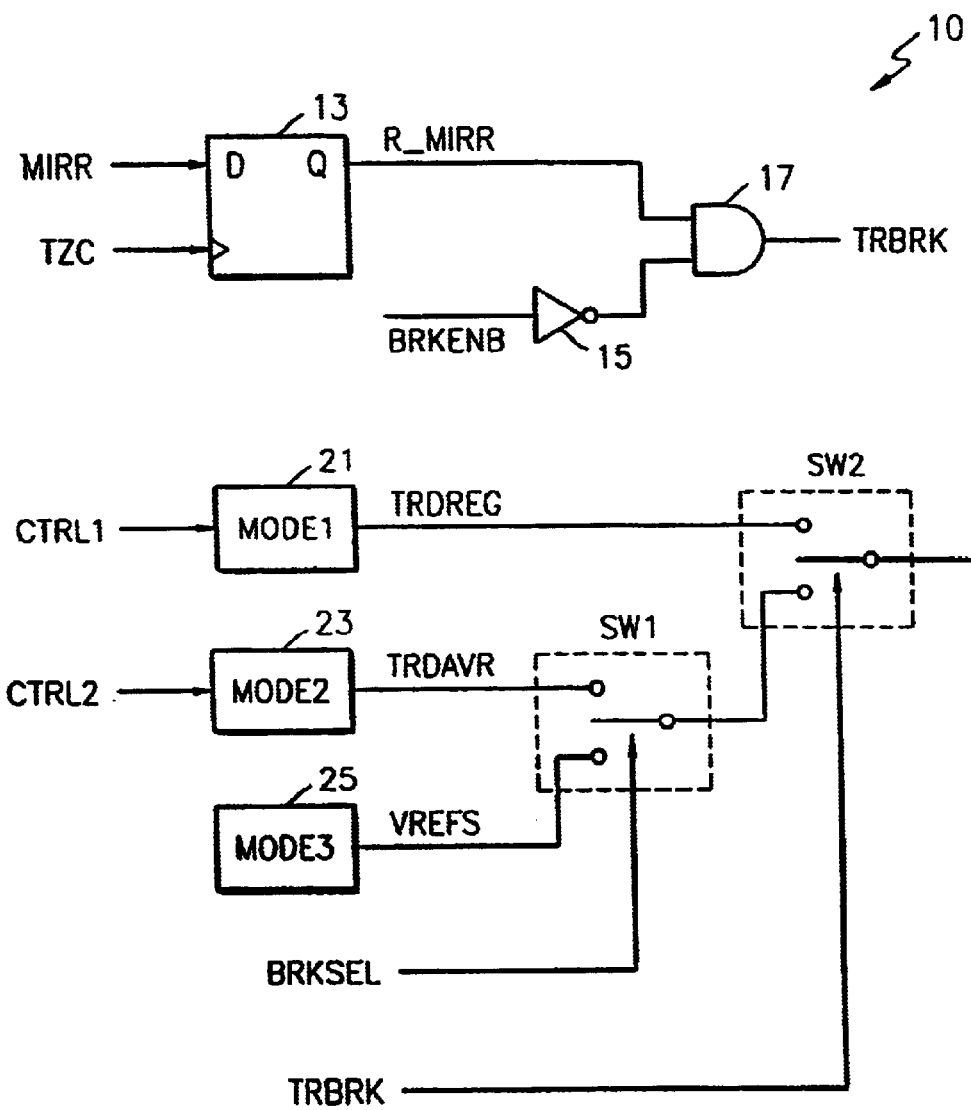
FIG. 1 is a block diagram showing an existing brake signal generating circuit.
Figure 2:
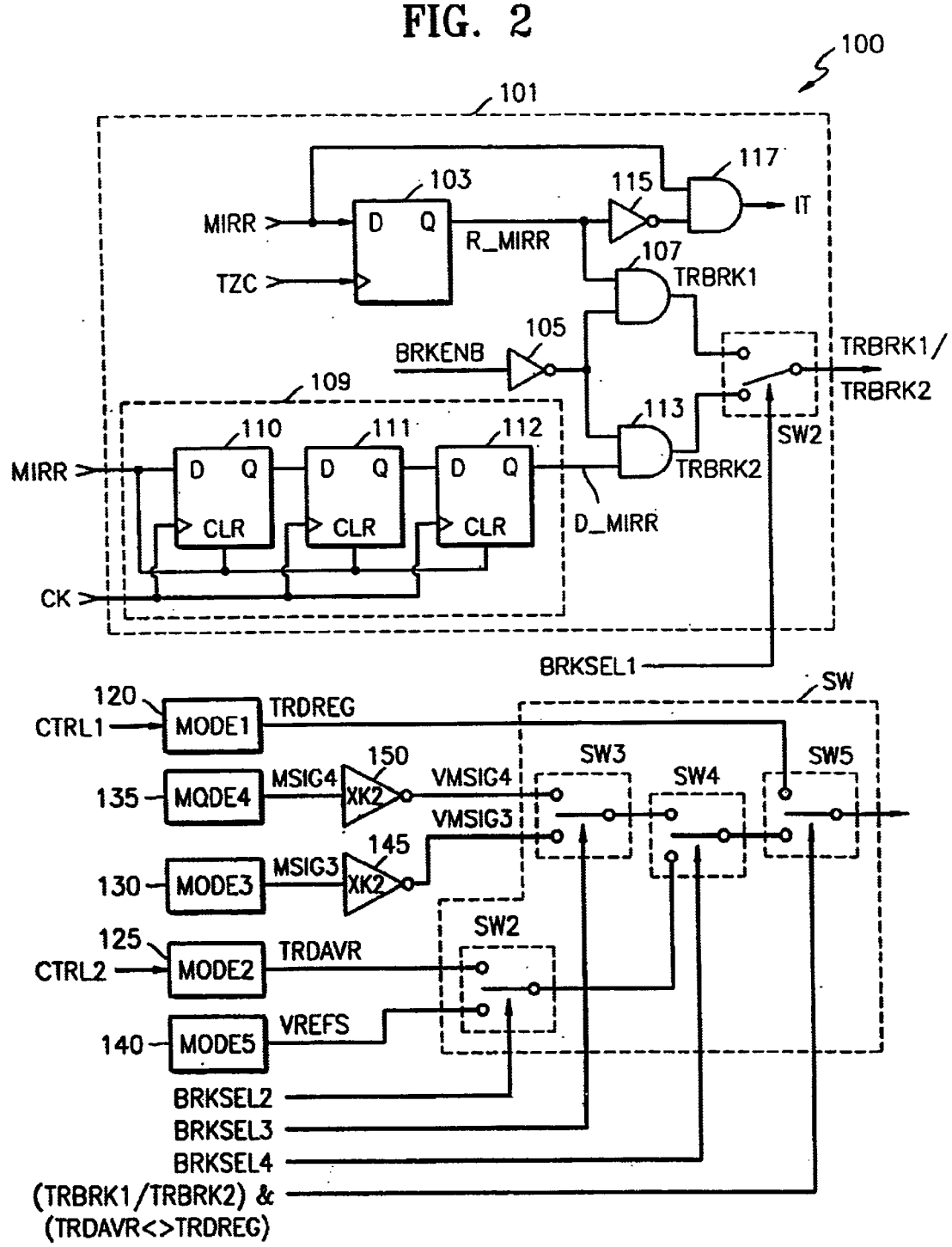
FIG. 2 is a block diagram showing a brake signal generating circuit according to a first embodiment of the present invention.

A brake signal generating circuit according to a first embodiment of the present invention is shown in FIG. 2.

Figure 3A:
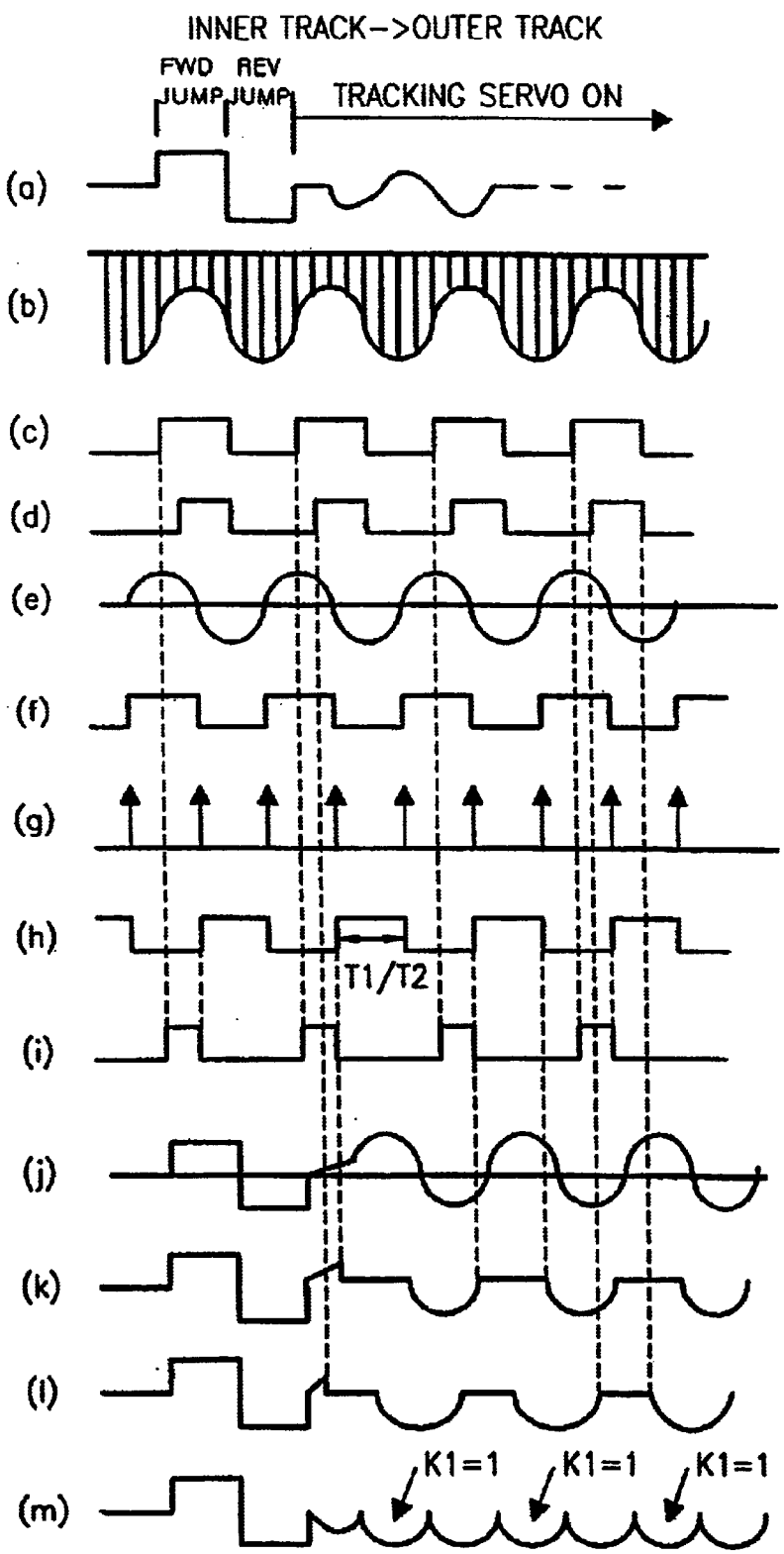
FIG. 3A is a waveform diagram showing the waveform of the signals occurring in the brake signal generating circuit of FIG. 2 when a main beam moves from an inner track to an outer track.
Figure 3B:
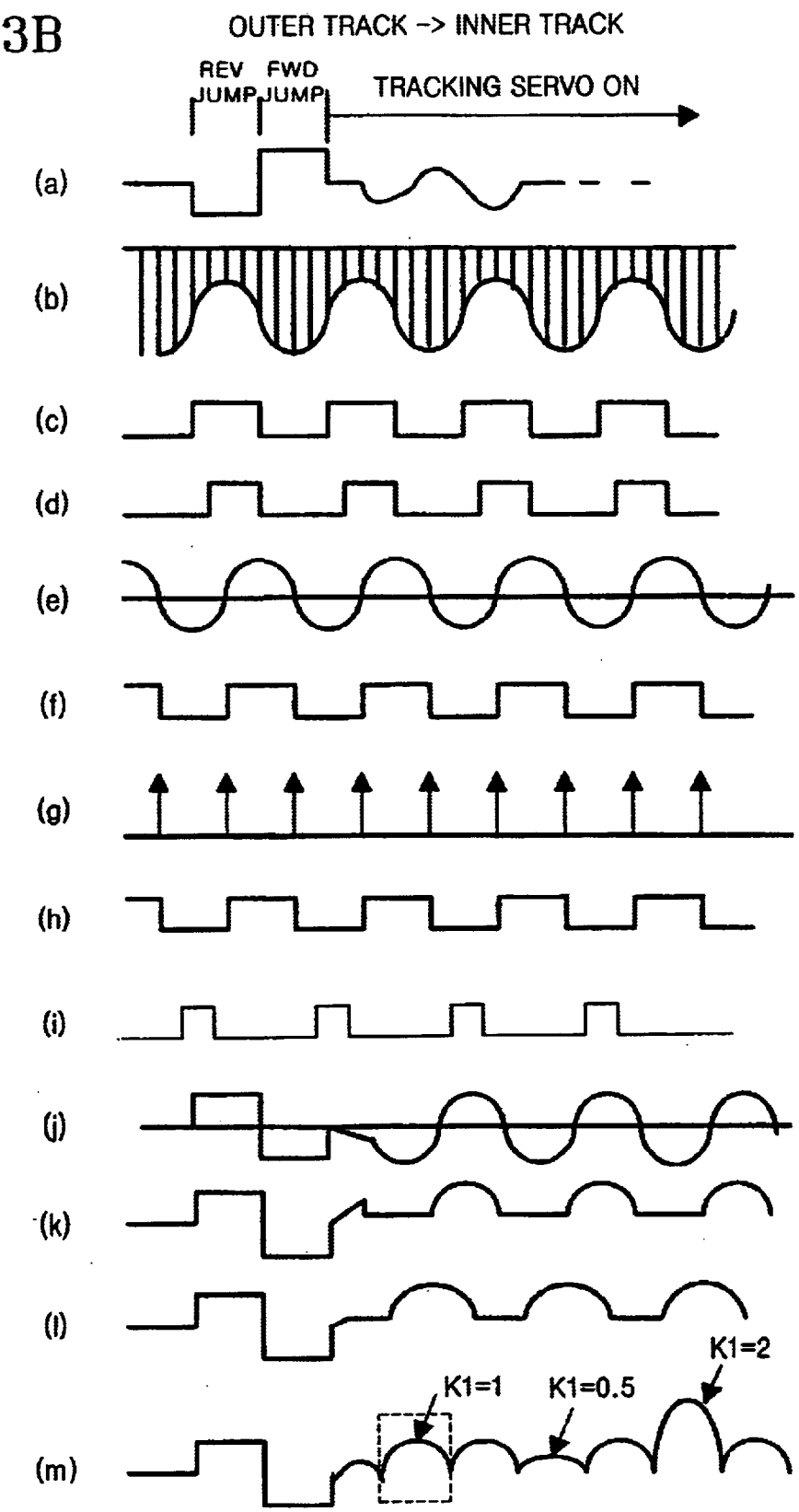
FIG. 3B is a waveform diagram showing the waveform of the signals occurring in the brake signal generating circuit of FIG. 2 when the main beam moves from the outer track to the inner track.
Figure 3C:
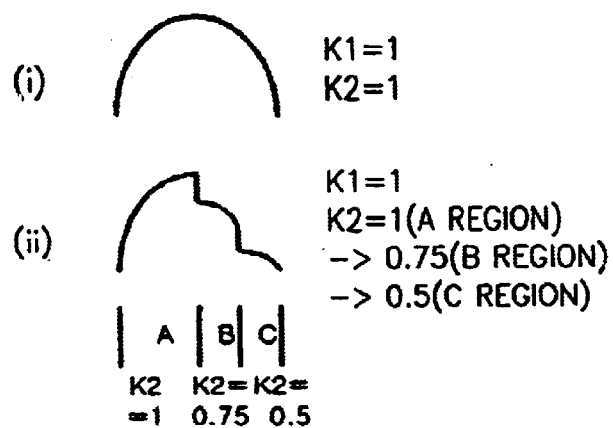
FIG. 3C shows changes in the waveform of the operation mode signals in FIG. 2 for different values of K1 and K2.
Figure 4:
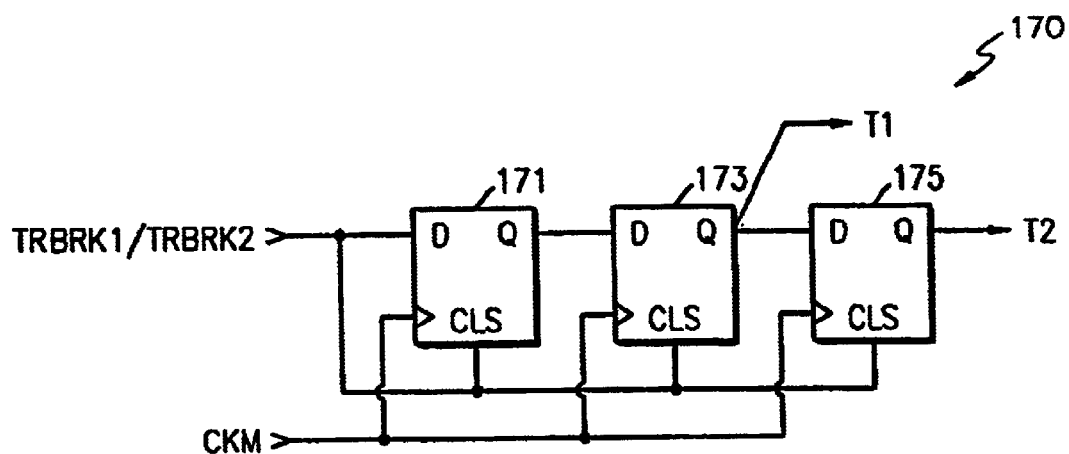
FIG. 4 shows a counter designed to determine the value of K2 in FIG. 2.

FIG. 3A is a waveform diagram of the signals occurring in the brake signal generating circuit in FIG. 2 when a main beam moves from an inner track to an outer track. FIG. 3B is a waveform diagram of the signals occurring in the brake signal generating circuit in FIG. 2 when the main beam moves from the outer track to the inner track. FIG. 3C shows changes in the waveform of the operation mode signals in FIG. 2 for different K1 and K2 values. FIG. 4 shows a counter designed to determine the value of K2 in FIG. 2.

As shown in FIGS. 2 through 4, the brake signal generating circuit 100 according to the first embodiment of the present invention includes a brake signal generator 101, a first operation mode generator 120, a second operation mode generator 125, a third operation mode generator 130, a fourth operation mode generator 135, a fifth operation mode generator 140, and a switch unit SW.

With reference to FIGS. 2 through 4, the brake signal generating circuit 100 and a braking signal generation method according to the first embodiment of the present invention will be described in detail.

The brake signal generator 101 receives a mirror signal MIRR that detects the track movement of the main beam and generates a first brake signal TRBRK1 or a second brake signal TRBRK2, which selects predetermined operation mode signals TRDREG, TRDAVR, MSIG3, MSIG4, or VREFS in response to a first brake selection signal BRKSEL1.

To perform the above functions, the brake signal generator 101 includes a latch 103, an inverter 105, first and second AND units 107 and 113, a delay unit 109 and a first switch SW1.

In more details, the latch 103 of the brake signal generator 100 responds to the rising edge and the falling edge of a track zero crossing signal TZC generated from a signal difference of side beams and outputs a latched mirror signal R_MIRR by latching the mirror signal MIRR. Since the signals TZC, MIRR and R_MIRR were described above, additional explanation will be omitted. The signals are shown in (g), (c) and (h) of FIGS. 3A and 3B, respectively.

The first AND unit 107 generates the first brake signal TRBRK1 for selecting one of the multiple operation mode signals TRDREG, TRDAVR, MSIG3, MSIG4, and VREFS by performing an AND-operation on the inverted signal of the brake enable signal BRKENB for generating the brake signal TRBRK and the latched mirror signal R_MIRR.

That is, if the level of the brake enable signal BRKENB is logic low, the first AND unit 107 generates the first brake signal TRBRK1 for controlling a fifth switch SW5.

The delay unit 109 receives the mirror signal MIRR in response to a predetermined clock signal CK and outputs a delayed mirror signal D_MIRR. The delay unit 109 includes multiple flip-flops 110 through 112 and adjusts the degree by which the mirror signal MIRR is delayed, by adjusting the number of flip-flops 110 through 112. In addition, a rate of the clock signal can be arbitrarily adjusted.

The second AND unit 113 generates the second brake signal TRBRK2 for selecting one of the operation mode signals TRDREG, TRDAVR, MSIG3, MSIG4, and VREFS by performing an AND-operation on the inverted signal of the brake enable signal BRKENB and the delayed mirror signal D_MIRR. The first switch SW1 selectively outputs the first brake signal TRBRK1 or second brake signal TRBRK2 in response to the first brake selection signal BRKSEL1.

The operation of the brake signal generator 101 will now be described in more detail.

The latched mirror signal R_MIRR indicates whether the main beam moves from the inner track to the outer track or vice versa. That is, when the main beam moves from the inner track to the outer track, the latched mirror signal R_MIRR is generated in inverse phase to the track zero crossing signal TZC. Conversely, when the main beam moves from the outer track to the inner track, the latched mirror signal R_MIRR is generated in the same phase as the track zero crossing signal TZC.

If the main beam deviates from the track, the brake enable signal BRKENB is generated in a low level and AND-operated with the latched mirror signal R_MIRR to generate the first brake signal TRBRK1.

The delayed mirror signal D_MIRR, which is delayed only in the ascending part of the mirror signal MIRR, is used to generate the second brake signal TRBRK2. The delayed mirror signal D_MIRR is generated while the mirror signal MIRR passes the delay unit 109, which comprises multiple flip-flops 110 through 112. The flip-flop 110 receives the mirror signal MIRR in response to the clock signal CK, transmits the mirror signal MIRR to the next flip-flop 111, and is reset by the falling edge of the mirror signal MIRR. The delay unit 109 can adjust the delay time using multiple flip-flops 110 through 112.

The delayed mirror signal D_MIRR is used to prevent the main beam from deviating from the track by pushing a point of time at which the second brake signal TRBRK2 is generated ahead, wherein the second brake signal TRBRK2 brakes the track deviation when the main beam deviates by an amount of ½ of the track. According to the type of systems, the rate of the clock signal CK may be varied to adjust a point of time at the brake operation is performed.

That is, the brake operation can be initiated ahead when the amount of the track deviation of the main beam is small, by using the delayed mirror signal D_MIRR. In addition, while the tracking actuator normally traces the tracks according to the beam displacement from the disc, the mirror signal MIRR and the brake signal TRBBRK may be generated. As a solution to this problem, the delayed mirror signal D_MIRR can be used to prevent the optical disc system from sensitively responding to even a small track deviation during the normal tracking of the tracking actuator.

In FIGS. 3A and 3B, (k) and (l) are waveforms illustrating the braking operation is initiated earlier by the delayed mirror signal D_MIRR than by the latched mirror signal R_MIRR, wherein (k) is for the latched mirror signal R_MIRR and (I) is for the delayed mirror signal D_MIRR.

The brake enable signal BRKENB is used to determine whether or not to use the brake signal generating circuit 100. If the brake signal generating circuit 100 is used, the duration of time for the brake operation is determined by the first or second brake signal TRBRK1 or TRBRK2.

The first switch SW1 selects one of the first and second brake signals TRBRK1 and TRBRK2 in response to the first brake selection signal BRKSEL1. In particular, if the first brake selection signal BRKSEL1 is in a logic high, the first switch SW1 selects the first brake signal TRBRK1. If the first brake selection signal BRKSEL1 is a logic low, the first switch SW1 selects the second brake signal TRBRK2. The logic level of the first brake selection signal BRKSEL1 designed to select the first or second brake signal TRBRK1 or TRBRK2 may be defined to be opposite to the above case. The logic level of the first brake selection signal BRKSEL1 that selects the first or second brake signal TRBRK1 or TRBRK2 to be used may be previously determined by a microprocessor (not shown) and fixed when the brake signal generating circuit 100 is mounted in the optical disc reproducing system. However, as the case may be, it may be determined which one of the first and second brake signals TRBRK1 and TRBRK2 is used while the optical disc reproducing system is used.

When the brake signal generator 101 generates the first brake signal TRBRK1, the brake signal generator 101 may further include an inverter 115 for inverting the latched mirror signal R_MIRR, and an AND unit 117 for generating an inertia signal (IT) by performing AND-operation on the output from the inverter 115 and the mirror signal MIRR.

When the brake signal generator 101 generates the second brake signal TRBRK2, the inertia signal IT can be generated as a result of the AND operation of the inverted signal of the delayed mirror signal D_MIRR and the mirror signal MIRR. The inertia signal IT is shown in (i) of FIGS. 3A and 3B, and the functions of the inertia signal IT will be described below.

The first operation mode generator 120 processes the gain and phase of a tracking error and outputs the result as a first operation mode signal TRDREG in response to a predetermined first control signal CTRL1. The first operation mode signal TRDREG is shown in (j) of FIGS. 3A and 3B.

The second operation mode generator 125 generates a correction value of the tracking loop offset as a second operation mode signal TRDAVR in response to a predetermined second control signal CTRL2. The fifth operation mode generator 140 generates a predetermined reference voltage as a fifth operation mode signal VREFS. Since the first, second, and fifth operation mode signals TRDREG, TRDAVR, and VREFS were described above, detailed explanations thereof will be omitted.

The third operation mode generator 130 generates the product of the first operation mode signal and a predetermined value K1 as a third operation mode signal MSIG3, where K1 is a non-zero real number. In other words, the third operation mode generator 130 can adjust the brake operation amount by inverting the track deviation error value and multiplying it by the value of K1 or process the error in the opposite direction as much as the track deviation error amount, thereby improving the brake efficiency.

Here, the value of K1 is determined by measurement of the duration of the logic high level of the inertia signal IT. Since the distance between tracks is uniform, the time spent for the main beam to move between tracks reduces and the period of the high level of the inertia signal IT becomes smaller if the inertia of the main beam which moves between tracks is great. If the inertia of the main beam which moves between tracks is small, the time spent for the main beam to move between tracks increases, and thus, the period of the high level of the inertia signal IT becomes longer. Accordingly, the value of K1 can be determined depending on the value of the inertia signal IT. Likewise, the inverting of the value of the tracking error output and the appropriate determination of the brake operation amount using the inertia signal IT enable a precise brake operation control.

The waveform of the third operation mode signal MSIG3 is shown in (m) of FIGS. 3A and 3B. In FIG. 3A, (m) is when the value of K1 is 1. The amount of the brake operation can be adjusted depending on the value of K1 by which the first operation mode signal TRDREG is multiplied. The waveform (m) of FIG. 3B is for when the value of K1 is 0.5, 1, and 2, The fourth operation mode generator 135 generates as a fourth operation mode signal MSIG4 a value obtained by subtracting the value of the first operation mode signal TRDREG from the value of the second operation mode signal TRDAVR, multiplying the result of the subtraction by a predetermined value K1, where K is a non-zero real number, and adding the value of the second operation mode signal TRDAVR to the product. The fourth operation mode signal MSIG4 denotes the offset correction of the tracking loop output. Here, the value of K1 is determined by the inertia signal IT.

The brake signal generating circuit 100 may further include amplifiers 145 and 150. The amplifiers multiply the first or fourth operation mode signal MSIG3 or MSIG4 by the value of K2 and output the product as variable third or fourth operation mode signal VMSIG3 or VMSIG4, respectively.

The value of K2 can be determined by measurement of the duration of the logic high level of the first or second brake signal TRBRK1 or TRBRK2. The value of K2 is a predetermined value by which the third or fourth operation mode signal MSIG3 or MSIG4 is multiplied for the brake operation by the first or second brake signal TRBRK1 or TRBRK2. The brake amount can be adjusted depending on the duration of the brake operation.

The waveform change by the multiplication by the value of K2 is shown in FIG. 3C. In FIG. 3C, (i) is the case when K2 is 1, which is the same as the case when only K1 is applied, and (ii) shows the waveform of the brake amount change when K1 is 1 and K2 is 1, 0.75, and 0.5, respectively. The brake amount can be adjusted depending on the amount of the brake time, by varying the value of K2.

The counter 170 shown in FIG. 4 can be used to measure the duration of the logic high level of the first or second brake signal TRBRK1 or TRBRK2. The counter 170 includes multiple flip-flops 171, 173 and 175, which respond to a predetermined clock signal CKM, receive the first or second brake signal TRBRK1 or TRBRK2, and measure the duration of the logic high level of the first or second brake signal TRBRK1 or TRBRK2. The duration of the logic high level of the first or second brake signal TRBRK1 or TRBRK2 can be precisely measured by varying the rate of the clock signal CKM. The number of flip-flops 171, 173 and 175 may be varied. The duration of the logic high level of the first or second brake signal TRBRK1 or TRBRK2 is indicated as T1 or T2 in (h) of FIGS. 3A and 3B.

A switch unit SW outputs one of the first through fifth operation mode signals TRDREG, TRDAVR, MSIG3, MSIG4, and VREFS in response to the first or second brake signals TRBRK1 or TRBRK2 and the second through fourth brake selection signals BRKSEL2, BRKSEL3, and BRKSEL4.

The second switch SW2 of the switch unit SW selects and outputs the second or fifth operation mode signal TRDAVR or VREFS depending on the logic level of the second brake selection signal BRKSEL2. The signal which is selected when the second brake selection signal BRKSEL2 is in a high level is determined by the circuit configuration.

The third switch SW3 selects and outputs the third or fourth operation mode signal MSIG3 or MSIG4 depending on the logic level of the third brake selection signal BRKSEL3. The signal which is selected when the third brake signal BRKSEL3 is in a high level is determined by the circuit configuration.

The fourth switch SW4 selects and outputs an output signal of the second switch SW2 or third switch SW3 depending on the logic level of the fourth brake selection signal BRKSEL4. The switch output signal which is selected when the fourth brake selection signal BRKSEL4 is in a high level is determined by the circuit configuration.

The logic levels of the first through fourth brake selection signals BRKSEL1, BRKSEL2, BRKSEL3 and BRKSEL4 are determined by a microprocessor (not shown). Therefore, which signal of the second through fifth operation mode signals TRDAVR, MSIG3, MSIG4 and VREFS is selected and output for the brake operation is determined by a microprocessor (not shown).

The fifth switch SW5 responds to the logic level of the first or second brake signal TRBRK1 or TRBRK2 and the result of a value comparison between the first and second operation mode signals TRDREG and TRDAVR, selects and outputs the first operation mode signal TRDREG or an output signal of the fourth switch SW4.

For example, if the first or second brake signal TRBRK1 or TRBRK2 is generated a logic low level, it means that the brake operation is not performed. Therefore, the fifth switch SW5 selects and outputs the first operation mode signal TRDREG.

However, if a main beam deviates by more than ½ of the track width, the tracking error output is inverted in the present invention to return the main beam to the original position. If a main beam deviates by less than ½ of the track width, the tracking error is output in an opposite phase to the error resulting from the track deviation, so it does not seem to be a tracking error. In this case, the normal tracking control is needed without inverting the output of the tracking error.

When the first and second operation mode signals TRDREG and TRDAVR are compared, it can be identified whether or not the main beam deviates by more than ½ of the track width. In particular, if a value of the second operation mode signal TRDAVR is smaller than that of the first operation mode signal TRDREG while a main beam deviates from an inner track to an outer track, or if a value of the second operation mode signal TRDAVR is greater than that of the first operation mode signal TRDREG while a main beam deviates from an outer track to an inner track, it is believed that the main beam deviates by more than ½ of the track width. In those cases, the first operation mode signal TRDREG is multiplied by the value of K1 or K2 to select and output the third or fourth operation mode signal MISG3 or MISG4 for controlling the brake amount.

In contrast, if a value of the second operation mode signal TRDAVR is greater than that of the first operation mode signal TRDREG while a main beam moves from an inner track to an outer track, or if a value of the second operation mode signal TRDAVR is smaller than that of the first operation mode signal TRDAVR while a main beam moves from an outer track to an inner track, it is believed that the main beam deviates by less than ½ of the track width. In those cases, the first operation mode signal TRDREG is output without multiplication.

Therefore, if the first of second brake signal TRBRK1 or TRBRK2 is in a logic high and the value of the second operation mode signal TRDABR is smaller than the first operation mode signal TRDREG while a main beam deviates from an inner track to an outer track, or if the first of second brake signal TRBRK1 or TRBRK2 is in a logic high and the value of the second operation mode signal TRDAVR is greater than the first operation mode signal TRDREG while a main beam deviates from an outer track to an inner track, the output signal of the fourth switch SW4 is selected and output.

The first through fifth operation mode signals TRDREG, TRDAVR, MSIG3, MSIG4, and VREFS selected by the fifth switch SW5 are output after pulse width modulation (PWM) or through a digital analog converter (DAC).

The logic levels of the first through fourth brake selection signals BRKSEL1, BRKSEL2, BRKSEL3, and BRKSEL4 may be determined, for example, to be logic high, by a microprocessor prior to the mounting of the brake signal generation circuit 100 into an optical disk reproducing system such that one of the second through fifth operation mode signals TRDAVR, MSIG3, MSIG4, and VREFS can be output during the brake operation.

Alternatively, the logic levels of the first through fourth brake selection signals BRKSEL1, BRKSEL2, BRKSEL3, and BRKSEL4 may be determined, for example, to be logic high, by a microprocessor during the operation of the optical disk reproducing system according to external conditions such that the brake signal generation circuit 100 can output one of the second through fifth operation mode signals TRDAVR, MSIG3, MSIG4, and VREFS for the brake operation.

Furthermore, whether to select one of the second through fifth operation mode signals TRDAVR, MSIG3, MSIG4, and VREFS for the brake operation irrespective of or according to the external conditions will be determined by the circuit configuration of the optical disc reproducing system equipped with the brake signal generating circuit 100.

For the first brake signal TRBRK1, the second, third, fourth, or fifth operation mode signals TRDAVR, MSIG3, MSIG4, or VREFS can be selected. For the second brake signal TRBRK2, the second, third, fourth, or fifth operation mode signal TRDAVR, MSIG3, MSIG4 and VREFS can be selected. Therefore, according to the first embodiment of the present invention, the brake operation can be performed in a total of eight modes.

It is appreciated that the brake signal generating circuit 100 can be implemented with an analog circuit. As an example, the brake amount can be adjusted by the resistance ratio using an operational amplifier or resistors.

According to the brake signal generating circuit 100 of the present invention, stable tracing is guaranteed, settling time after the track jump is reduced, the data access can be faster, and the unstable state, for example, due to the track skipping, can return to the initial stable state quickly. Therefore, as for portable optical devices, the track skipping caused by shocks can be drastically reduced and stable tracking servo control can be performed.

The operation of the brake signal generating circuit 100 according to the first embodiment of the present invention can be performed or stopped under control of a LOCK (or CLV LOCK) signal, which occurs when a normally operating disc reproducing system cannot read data, a Tracking Gain Up Command to trace tracks, or an anti-shock detect control signal, which determines if the disc is under impact. Therefore, when the optical disc reproducing system is in a transient state, a careful consideration can be given to the control of the brake signal.

Figure 5:
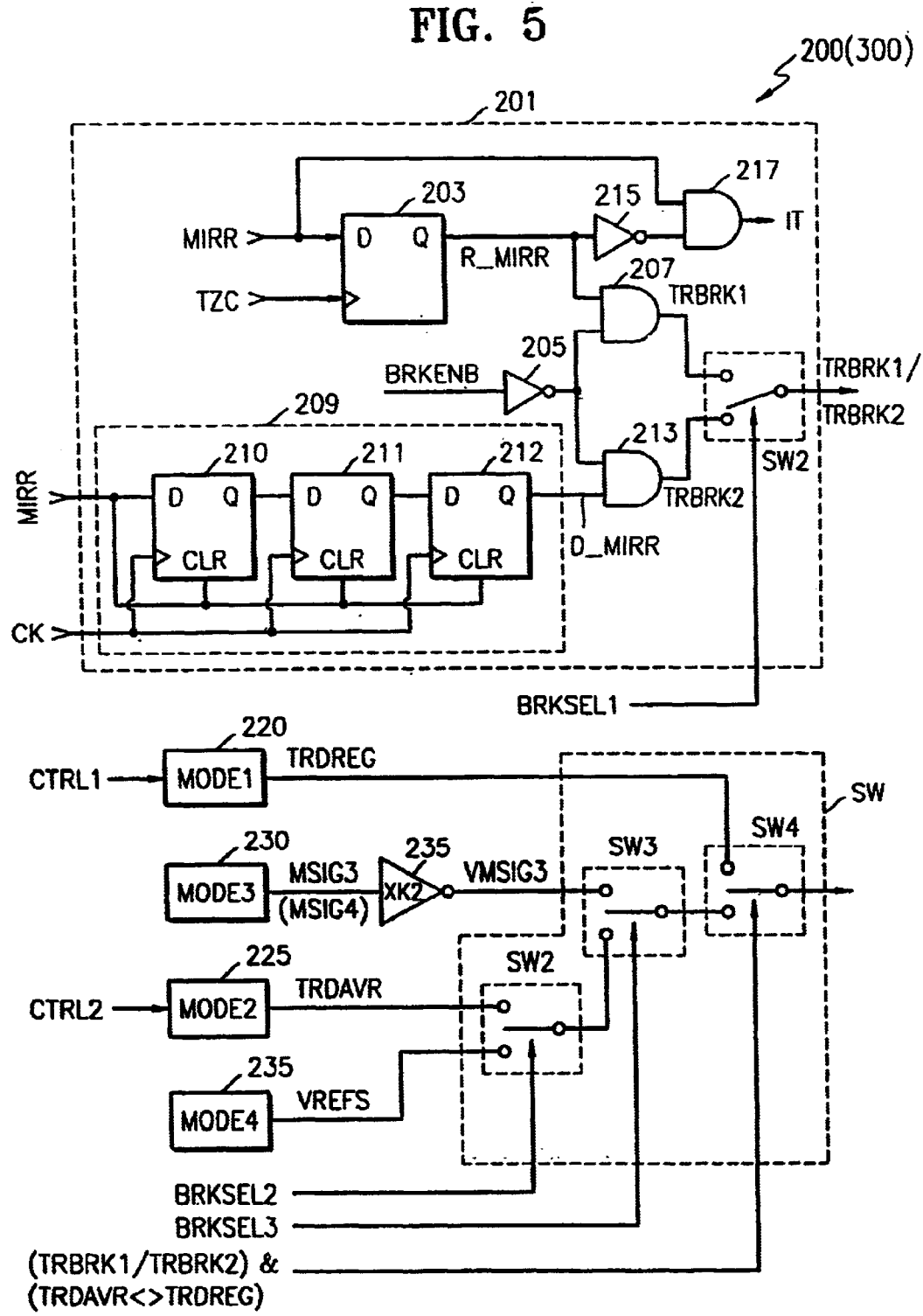
FIG. 5 is a block diagram showing a brake signal generating circuit according to the second and third embodiments of the present invention.

FIG. 5 is a block diagram showing the brake signal generating circuit according to the second and third embodiments of the present invention. A brake signal generating circuit 200 according to the second embodiment of the present invention includes a brake signal generator 201, a first operation mode generator 220, a second operation mode generator 225, a third operation mode generator 230, a fourth operation mode generator 235, and a switch unit SW.

The brake signal generator 201 is the same as the brake signal generator 101 of the brake signal generating circuit 100 according to the first embodiment of the present invention in terms of configuration and operation. The first and second operation mode signals TRDREG and TRDAVR in the brake signal generating circuit 200 are identical to those in the brake signal generating circuit 100 according to the first embodiment. A fourth operation mode signal in the brake signal generating circuit 200 is identical to the fifth operation mode signal VREFS in the brake signal generating circuit 100 according to the present invention and thus is denoted by VREFS. A third operation mode signal MSIG3 in the brake signal generating circuit 200 is identical to that of the brake signal generating circuit 100 according to the present invention. That is, the brake signal generating circuit 200 according to the second embodiment of the present invention is identical to the brake signal generating circuit 100 according to the present invention in terms of configuration and operation, except that the fourth operation mode signal MSIG4 is not used. Therefore, a detailed explanation of the brake signal generating circuit 200 is not repeated here.

A brake signal generating circuit 300 according to the third embodiment of the present invention is the same as the brake signal generating circuit 200 of the second embodiment in terms of configuration and operation except that the third operation mode signal MSIG3 of the brake signal generating circuit 200 according to the second embodiment is replaced by the fourth operation mode signal MSIG4 of the brake signal generating circuit 100 according to the first embodiment. Therefore, a detailed explanation thereof is not repeated here.

As described above, according to the brake signal generating circuit and the method thereof of the present invention, the brake amount is inverted as much as the error value in a track deviation direction and multiplied by a gain factor to improve the brake efficiency. In addition, the settling time after the track jump is reduced, the data access can be faster, and the unstable operating state, for example, due to track skipping, can return to the original stable state quickly.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A brake signal generating circuit comprising:
    a brake signal generator which receives a mirror signal that detects the track movement of a main beam and generates one of a first brake signal and a second brake signal for selecting predetermined operation mode signals in response to a first brake selection signal;
    a first operation mode generator which generates a processing value of the gain and phase of a tracking error as a first operation mode signal in response to a predetermined first control signal;
    a second operation mode generator which generates a correction value of a tracking loop offset as a second operation mode signal in response to a predetermined second control signal;
    a third operation mode generator which generates a value obtained by multiplying a value of the first operation mode signal by a predetermined value K1, where K1 is a non-zero real number, as a third operation mode signal;
    a fourth operation mode generator which generates as a fourth operation mode signal a value obtained by subtracting the value of the first operation mode signal from a value of the second operation mode signal, multiplying the result of the subtraction by the predetermined value K1, and adding the value of the second operation mode signal to the product;
    a fifth operation mode generator which generates a predetermined reference voltage as a fifth operation mode signal; and
    a switch unit which outputs one of the first through fifth operation mode signals in response to one of the first and second brake signals and second through fourth brake selection signals.

2. The brake signal generating circuit of claim 1, wherein the brake signal generator comprises:
    a latch which responds to rising and falling edges of a track zero crossing signal generated from a signal difference between side beams and latches the mirror signal to output a latched mirror signal;
    a first AND unit which generates the first brake signal for selecting one of the first through fifth operation mode signals by performing an AND-operation on an inverted signal of a brake enable signal for generating the first or second brake signal and the latched mirror signal;
    a delay unit which receives the mirror signal and outputs a delayed mirror signal in response to a predetermined clock signal;
    a second AND unit which generates the second brake signal for selecting one of the first through fifth operation mode signals by performing an AND-operation on an inverted signal of the brake enable signal and the delayed mirror signal; and
    a first switch which selects and outputs one of the first and second brake signals in response to the first brake selection signal.

3. The brake signal generating circuit of claim 2, wherein the delay unit comprises a plurality of flip-flops that operate in response to the clock signal.

4. The brake signal generating circuit of claim 2, wherein a rate of the clock signal is arbitrarily determined.

5. The brake signal generating circuit of claim 2, wherein the brake signal generator comprises:
    an inverter which inverts the latched mirror signal; and
    an AND unit which generates an inertia signal by performing an AND-operation on an output signal of the inverter and the mirror signal.

6. The brake signal generating circuit of claim 5, wherein the value of K1 is determined by measurement of the duration of a logic high level of the inertia signal.

7. The brake signal generating circuit of claim 1, further comprising an amplifier which multiplies the third operation mode signal by a predetermined value of K2 and outputs the product as a variable third operation mode signal.

8. The brake signal generating circuit of claim 1, further comprising an amplifier which multiplies the fourth operation mode signal by a predetermined value of K2 and outputs the product as a variable fourth operation mode signal.

9. The brake signal generating circuit of claim 7 or 8, wherein the value of K2 is determined by measurement of the duration of a logic high level of the first or second brake signal.

10. The brake signal generating circuit of claim 1, wherein the switch unit comprises:
    a second switch which selects and outputs one of the second and fifth operation mode signals according to the logic level of the second brake selection signal;

a third switch which selects and outputs one of the third and fourth operation mode signals according to the logic level of the third brake selection signal;

a fourth switch which selects and outputs an output signal of one of the second and third switches according to the logic level of the fourth brake selection signal; and a fourth switch which selects and outputs one of the first operation mode signal and an output signal of the fourth switch in response to the logic level of one of the first and second brake signals and the result of a comparison between the first and second operation mode signals.

11. The brake signal generating circuit of claim 10, wherein the fifth switch selects and outputs the output signal of the fourth switch when one of the first and second brake signals is in a logic high level and a value of the second operation mode signal is smaller than a value of the first operation mode signal if a main beam deviates from an inner track from an outer track, and a value of the second operation mode signal is larger than a value of the first operation mode signal if a main beam deviates from an outer track to an inner track.

12. The brake signal generating circuit of claim 10, wherein the logic levels of the first through fourth brake selection signals are determined by a microprocessor.

13. A brake signal generating circuit comprising:

a brake signal generator which receives a mirror signal that detects the track movement of a main beam and generates a first brake signal that selects predetermined operation mode signals in response to a track zero crossing signal generated from a signal difference of side beams;

a first operation mode generator which generates a processing value of the gain and phase of a tracking error as a first operation mode signal in response to a predetermined first control signal;

a second operation mode generator which generates a correction value of a tracking loop offset as a second operation mode signal in response to a second control signal;

a third operation mode generator which generates a value obtained by multiplying a value of the first operation mode signal by a predetermined value K1, where K1 is a non-zero real number, as a third operation mode signal;

a fourth operation mode generator which generates a predetermined reference voltage as a fourth operation mode signal; and a switch unit which outputs one of the first through fourth operation mode signals in response to the first brake signal and first and second brake selection signals.

14. The brake signal generating circuit of claim 13, wherein the brake signal generator comprises:

a latch which responds to rising and falling edges of the track zero crossing signal generated from the signal difference between the side beams and latches the mirror signal to output a latched mirror signal; and a first AND unit which generates the first brake signal for selecting one of the first through fourth operation mode signals by performing an AND-operation on an inverted signal of a brake enable signal for generating the first brake signal and the latched mirror signal.

15. The brake signal generating circuit of claim 14, wherein the brake signal generator comprises:

an inverter which inverts the latched mirror signal; and an AND unit which generates an inertia signal by performing an AND-operation on an output signal of the inverter and the mirror signal.

16. The brake signal generating circuit of claim 15, wherein the value of K1 is determined by measurement of the duration of a logic high level of the inertia signal.

17. The brake signal generating circuit of claim 14, wherein the brake signal generator comprises:

a delay unit which receives the mirror signal and outputs a delayed mirror signal in response to a predetermined clock signal;

a second AND unit which generates a second brake signal for selecting one of the first through fifth operation mode signals by performing an AND-operation on an inverted signal of the brake enable signal and the delayed mirror signal; and a first switch which selects and outputs one of the first and second brake signals in response to a third brake selection signal.

18. The brake signal generating circuit of claim 17, wherein the delay unit comprises a plurality of flip-flops that operate in response to the clock signal.

19. The brake signal generating circuit of claim 17, wherein a rate of the clock signal is arbitrarily determined.

20. The brake signal generating circuit of claim 17, wherein the value of K2 is determined by measurement of the duration of a logic high level of one of the first and second brake signals.

21. The brake signal generating circuit of claim 17, wherein the switch unit comprises:

a second switch which selects and outputs one of the second and fourth operation mode signals according to the logic level of the first brake selection signal;

a third switch which selects and outputs one of the third operation mode signal and an output signal of the second switch according to the logic level of the second brake selection signal; and a fourth switch which selects and outputs one of the first operation mode signal and an output signal of the third switch in response to the logic level of one of the first and second brake signals and the result of a comparison between the first and second operation mode signals.

22. The brake signal generating circuit of claim 13, further comprising an amplifier which multiplies the third operation mode signal by a predetermined value of K2 and outputs the product as a variable third operation mode signal.

23. The brake signal generating circuit of claim 16 or 21, wherein the logic levels of the first through third brake selection signals are determined by a microprocessor.

24. A brake signal generating circuit comprising:

a brake signal generator which receives a mirror signal that detects the track movement of a main beam and generates a first brake signal that selects predetermined operation mode signals in response to a track zero crossing signal generated from the signal difference of side beams;

a first operation mode generator which generates a processing value of the gain and phase of a tracking error as a first operation mode signal in response to a predetermined first control signal;

a second operation mode generator which generates a correction value of a tracking loop offset as a second operation mode signal in response to a second control signal;

a third operation mode generator which generates as a third operation mode signal a value obtained by subtracting a value of the first operation mode signal from a value of the second operation mode signal, multiplying the result of the subtraction by a predetermined value K1, where K1 is a non-zero real number, and adding the value of the second operation mode signal to the product;

a fourth operation mode generator which generates a predetermined reference voltage as a fourth operation mode signal; and a switch unit which outputs one of the first through fourth operation mode signals in response to the first brake signal and first and second brake selection signals.

25. The brake signal generating circuit of claim 24, wherein the brake signal generator comprises:

a latch which responds to rising and falling edges of the track zero crossing signal generated from the signal difference between the side beams and latches the mirror signal to output a latched mirror signal; and a first AND unit which generates the first brake signal for selecting one of the first through fourth operation mode signals by performing an AND-operation on an inverted signal of a brake enable signal for generating the first brake signal and the latched mirror signal.

26. The brake signal generating circuit of claim 25, wherein the brake signal generator comprises:

an inverter which inverts the latched mirror signal; and an AND unit which generates an inertia signal by performing an AND-operation on an output signal of the inverter and the mirror signal.

27. The brake signal generating circuit of claim 26, wherein the value of K1 is determined by measurement of the duration of a logic high level of the inertia signal.

28. The brake signal generating circuit of claim 25, wherein the brake signal generator comprises:

a delay unit which receives the mirror signal and outputs a delayed mirror signal in response to a predetermined clock signal;

a second AND unit which generates a second brake signal for selecting one of the first through fifth operation mode signals by performing an AND-operation on an inverted signal of the brake enable signal and the delayed mirror signal; and a first switch which selects and outputs the first or second brake signal in response to a third brake selection signal.

29. The brake signal generating circuit of claim 28, wherein the delay unit comprises a plurality of flip-flops that operate in response to the clock signal.

30. The brake signal generating circuit of claim 28, wherein a rate of the clock signal is arbitrarily determined.

31. The brake signal generating circuit of claim 28, wherein the value of K2 is determined by measurement of the duration of a logic high level of one of the first snf second brake signal.

32. The brake signal generating circuit of claim 28, wherein the switch unit comprises:

a second switch which selects and outputs one of the second and fourth operation mode signal according to the logic level of the first brake selection signal;

a third switch which selects and outputs one of the third operation mode signal and an output signal of the second switch according to the logic level of the second brake selection signal; and a fourth switch which selects and outputs one of the first operation mode signal and an output signal of the third switch in response to the logic level of one of the first and second brake signal and the result of a comparison between the first and second operation mode signals.

33. The brake signal generating circuit of claim 24, further comprising an amplifier which multiplies the third operation mode signal by a predetermined value of K2 and outputs the product as a variable third operation mode signal.

34. The brake signal generating circuit of claim 28 or 33, wherein the logic levels of the first through third brake selection signals are determined by a microprocessor.

35. A brake signal generation method that improves the efficiency of a lens brake of an optical disc reproducing system, the method comprising:

(a) receiving a mirror signal that detects the track movement of a main beam and generating one of a first and second brake signal that selects a plurality of operation mode signals for controlling the brake amount in response to a first brake selection signal; and (b) outputting one of the plurality of operation mode signals in response to the one of the first and second brake signals and a plurality of brake selection signals;

wherein step (a) comprises:

(a1) responding to rising and falling edges of a track zero crossing signal generated from a signal difference between side beams and latching the mirror signal to output a latched mirror signal;

(a2) generating the first brake signal for selecting one of the plurality of operation mode signals by performing an AND-operation on an inverted signal of a brake enable signal for generating the one of the first and second brake signals and the latched mirror signal;

(a3) receiving the mirror signal and generating a delayed mirror signal in response to a predetermined clock signal;

(a4) generating the second brake signal for selecting one of the plurality of operation mode signals by performing an AND-operation on an inverted signal of the brake enable signal and the delayed mirror signal; and (a5) selecting and outputting the one of the first and second brake signals in response to the first break selection signal.

36. The brake signal generation method of claim 35, wherein a rate of the clock signal is arbitrarily determined.

37. The brake signal generation method of claim 35, wherein step (a1) further comprises:

inverting the latched mirror signal; and generating an inertia signal by performing an AND-operation on the inverted latched mirror signal and the mirror signal.

38. The brake signal generation method of claim 35, wherein the plurality of operation mode signals output in step (b) comprises:

a first operation mode signal of a value obtained by processing the gain and phase of a tracking error in response to a predetermined first control signal;

a second operation mode signal of a value obtained by correcting a tracking loop offset in response to a predetermined second control signal;

a third operation mode signal of a value obtained by multiplying the value of the first operation mode signal by a predetermined value K1, where K1 is a non-zero real number;

a fourth operation mode signal of a value obtained by subtracting the value of the first operation mode signal from the value of the second operation mode signal, multiplying the result of the subtraction by the predetermined value K1, and adding the value of the second operation mode signal to the product; and a fifth operation mode signal of a predetermined reference voltage.

39. The brake signal generation method of claim 38, wherein the value of K1 is determined by measurement of the duration of a logic high level of an inertia signal obtained by performing an AND-operation on an inverted signal of the latched mirror signal and the mirror signal.

40. The brake signal generation method of claim 35, wherein step (b) comprises:
   (b1) selecting and outputting one of the second and fifth operation mode signal according to the logic level of a second brake selection signal selected from the plurality of brake selection signals;
   (b2) selecting and outputting one of the third and fourth operation mode signals according to the logic level of a third brake selection signal selected from the plurality of brake selection signals;
   (b3) selecting and outputting an output signal from step (b1) or step (b2) according to the logic level of a fourth brake selection signal selected from the plurality of brake selection signals; and
   (b4) selecting and outputting one of the first operation mode signal and an output signal from step (b3) in response to the logic level of one of the first and second brake signal and the result of a comparison between the first and second operation mode signals.

41. The brake signal generation method of claim 40, wherein step (b2) comprises selecting and outputting a variable third operation mode signal obtained by multiplying the third operation mode signal by a predetermined value of K2, or the fourth operation mode signal.

42. The brake signal generation method of claim 40, wherein step (b2) comprises selecting and outputting a variable fourth operation mode signal obtained by multiplying the fourth operation mode signal by a predetermined value of K2, or the third operation mode signal.

43. The brake signal generation method of claim 41 or 42, wherein the value of K2 is determined by measurement of the duration of a logic high level of one of the first and second brake signals.

44. The brake signal generation method of claim 40, wherein the logic levels of the first through fourth brake selection signals are determined by a microprocessor.

45. A brake signal generation method that improves the efficiency of a lens brake of an optical disc reproducing system, the method comprising:
   (a) receiving a mirror signal that detects the track movement of a main beam and generating a first brake signal that selects a plurality of operation mode signals for controlling the brake amount in response to a track zero crossing signal generated from a signal difference of side beams;
   (b) outputting one of the plurality of operation mode signals in response to the first brake signal and a plurality of brake selection signals; wherein step (a) comprises:
   (a1) responding to rising and falling edges of a track zero crossing signal generated from the signal difference between the side beams and latching the mirror signal to output a latched mirror signal;
   (a2) generating the first brake signal for selecting one of the plurality of operation mode signals by performing an AND-operation on an inverted signal of a brake enable signal for generating the first brake signal and the latched mirror signal;
   (a3) receiving the mirror signal and generating a delayed mirror signal in response to a predetermined clock signal;
   (a4) generating a second brake signal for selecting one of the plurality of operation mode signals by performing an AND-operation on an inverted signal of the brake enable signal and the delayed mirror signal; and
   (a5) selecting and outputting one of the first and second brake signals in response to the first break selection signal.

46. The brake signal generation method of claim 45, wherein step (a1) further comprises:
   inverting the latched mirror signal; and
   generating an inertia signal by performing an AND-operation on the inverted latched mirror signal and the mirror signal.

47. The brake signal generation method of claim 45, wherein a rate of the clock signal is arbitrarily determined.

48. The brake signal generation method of claim 45, wherein the plurality of operation mode signals output in step (b) comprises:
   a first operation mode signal of a value obtained by processing the gain and phase of a tracking error in response to a predetermined first control signal;
   a second operation mode signal of a value obtained by correcting a tracking loop offset in response to a predetermined second control signal;
   a third operation mode signal of a value obtained by multiplying the value of the first operation mode signal by a predetermined value K1, where K1 is a non-zero real number; and
   a fourth operation mode signal of a predetermined reference voltage.

49. The brake signal generation method of claim 45, wherein the plurality of operation mode signals output in step (b) comprises:
   a first operation mode signal of a value obtained by processing the gain and phase of a tracking error in response to a predetermined first control signal;
   a second operation mode signal of a value obtained by correcting a tracking loop offset in response to a predetermined second control signal;
   a third operation mode signal of a value obtained by subtracting the value of the first operation mode signal from the value of the second operation mode signal, multiplying the result of the subtraction by a predetermined value K1, where K1 is a non-zero real number, and adding the value of the second operation mode signal to the product; and
   a fourth operation mode signal of a predetermined reference voltage.

50. The brake signal generation method of claim 48 or 49, wherein the value of K1 is determined by measurement of the duration of a logic high level of an inertia signal obtained by performing an AND-operation on an inverted signal of the latched mirror signal and the mirror signal.

51. The brake signal generation method of claim 48 or 49, wherein step (b) comprises:
   (b1) selecting and outputting the second or fifth operation mode signal according to the logic level of a second brake selection signal selected from the plurality of brake selection signals;
   (b2) selecting and outputting one of the third operation mode signal and an output signal from step (b1) according to the logic level of a third brake selection signal selected from the plurality of brake selection signals; and (b3) selecting and outputting one of the first operation mode signal and an output signal from step (b2) in response to the logic level of one of the first and second brake signals and the result of a comparison between the first and second operation mode signals.

52. The brake signal generation method of claim 51, wherein step (b2) comprises selecting and outputting a variable third operation mode signal obtained by multiplying the third operation mode signal by a predetermined value of K2, or the output signal from step (b1).

53. The brake signal generation method of claim 52, wherein the value of K2 is determined by measurement of the duration of a logic high level of one of the first and second brake signals.

54. The brake signal generation method of claim 51, wherein the logic levels of the first through third brake selection signals are determined by a microprocessor.

* * * * *